(12) United States Patent
Miller et al.

(10) Patent No.: US 9,908,542 B2
(45) Date of Patent: Mar. 6, 2018

(54) EVENT RECORDER WITH CONFIGURABLE ALARM/EVENT MONITORING

(71) Applicant: Progress Rail Services Corporation, Albertville, AL (US)

(72) Inventors: Marc David Miller, Lee's Summit, MO (US); Gregory Richard Bessler, Summerdale, PA (US); Stephen Harold Humphrey, Pleasant Hill, MO (US)

(73) Assignee: Progress Rail Services Corporation, Albertville, AL (US)

( * ) Notice: Subject to any disclaimer, the term of this patent is extended or adjusted under 35 U.S.C. 154(b) by 0 days.

(21) Appl. No.: 15/097,913

(22) Filed: Apr. 13, 2016

(65) Prior Publication Data

US 2017/0297592 A1    Oct. 19, 2017

(51) Int. Cl.
   *B61L 15/00*      (2006.01)
   *B61L 25/02*      (2006.01)
   (Continued)

(52) U.S. Cl.
   CPC ....... *B61L 15/0063* (2013.01); *B61L 15/0072* (2013.01); *B61L 15/0081* (2013.01);
   (Continued)

(58) Field of Classification Search
   CPC ...... B61L 15/0063; G06Q 40/08; G06F 11/22
   See application file for complete search history.

(56) References Cited

U.S. PATENT DOCUMENTS

| | | | |
|---|---|---|---|
| RE35,590 E | 8/1997 | Bezos et al. | |
| 6,405,108 B1 * | 6/2002 | Patel | G05B 23/0221 701/19 |
| 6,810,312 B2 * | 10/2004 | Jammu | G06Q 10/06 246/169 R |
| 7,593,963 B2 | 9/2009 | Ballesty et al. | |
| 8,239,078 B2 * | 8/2012 | Siddappa | B61C 17/12 455/92 |

(Continued)

FOREIGN PATENT DOCUMENTS

| | | |
|---|---|---|
| CN | 201255896 | 6/2009 |
| CN | 104309613 | 1/2015 |
| WO | WO 2014/137643 | 9/2014 |

*Primary Examiner* — Alex C Dunn
(74) *Attorney, Agent, or Firm* — Finnegan, Henderson, Farabow, Garrett & Dunner, LLP (57) ABSTRACT

A event recorder system carried on-board a locomotive may include a controller configured to receive data from one or more of a train management system, a cab signaling system, an energy management system, an exhaust aftertreatment monitoring system, a braking system, a communications management system, and an operator fatigue or distraction monitoring system. The data may include one or more of video data, audio data, sensor output data, GPS map data, scanned image data of an operator in a cab of the locomotive, and operational data associated with operation of the locomotive during a trip. The controller may be configured to synchronize the data based on a common attribute associated with all of the data received by the controller, receive from a user one or more customizable parameters predetermined to be indicative of one or more of a system-related characteristic or behavior associated with any one or more of the systems from which the controller receives data, and generate a system notification based on an indication of one or more of a system-related characteristic or behavior that one of falls outside of a predetermined range of system-determinable parameters, or indicates a trend in one or more system-determinable parameters that deviates from an expected trend in the one or more system-determinable parameters.

17 Claims, 2 Drawing Sheets

(51) Int. Cl.
*B61L 27/00* (2006.01)
*G06Q 40/08* (2012.01)

(52) U.S. Cl.
CPC ......... *B61L 25/025* (2013.01); *B61L 27/0005* (2013.01); *B61L 27/0094* (2013.01); *B61L 2205/04* (2013.01); *G06Q 40/08* (2013.01)

(56) References Cited

U.S. PATENT DOCUMENTS

| | | | |
|---|---|---|---|
| 8,305,224 B2 | 11/2012 | Saito et al. | |
| 8,521,345 B2* | 8/2013 | Cooper | B61L 15/0081 701/19 |
| 9,002,547 B2* | 4/2015 | Matthews, Jr. | B60L 15/38 180/14.1 |
| 9,126,608 B2* | 9/2015 | Kapp | B61L 3/006 |
| 9,128,638 B2 | 9/2015 | Goergen | |
| 9,598,094 B2* | 3/2017 | Miller | B61C 17/12 |
| 2003/0222981 A1 | 12/2003 | Kisak et al. | |
| 2010/0286853 A1* | 11/2010 | Goodermuth | B61L 15/0072 701/19 |
| 2012/0089537 A1 | 4/2012 | Cooper et al. | |
| 2012/0290182 A1* | 11/2012 | Cooper | B61L 27/0027 701/70 |
| 2012/0290185 A1* | 11/2012 | Cooper | B61L 27/0027 701/93 |
| 2013/0173093 A1* | 7/2013 | Cooper | B61L 15/0063 701/19 |
| 2014/0067246 A1* | 3/2014 | Eldredge | B61L 3/006 701/123 |
| 2015/0195483 A1* | 7/2015 | Miller | B61L 27/0055 386/201 |
| 2016/0014111 A1* | 1/2016 | Kurz | G06F 21/44 713/172 |

* cited by examiner

EVENT RECORDER WITH CONFIGURABLE ALARM/EVENT MONITORING

TECHNICAL FIELD

The present disclosure relates generally to event recorders and, more particularly, an event recorder with configurable alarm/event monitoring.

BACKGROUND

Event recorders provided on various mobile vehicles, such as planes and trains, are generally designed to record data associated with an event during operation of the vehicle. The event recorders are typically designed and built to store that recorded data in a crash-hardened memory unit. A crash-hardened memory unit is configured to withstand the severe conditions that may occur during an accident. The memory units for these event recorders are contained within enclosures that allow the stored data to remain intact after accidents or other abnormal events. An important purpose of the event recorder is to provide a source of data that can be retrieved from the event recorder after an event such as an accident, and provide a detailed and accurate accounting of exactly what happened leading up to and during the event.

On-scene investigations after events involving mobile vehicles are time consuming and are not always accurate. Often, investigators must rely on witness statements and approximations to assess the events and the relative timing of the events leading up to the accident and to determine who is at fault. It is therefore difficult to guarantee the correctness of these assessments. Insurance companies use these assessments to determine who must pay for the damage after an accident has occurred. Incorrect assessments lead to money being spent unnecessarily by the insurance companies whose clients were not at fault.

A system capable of recording, reproducing and analyzing information pertaining to an accident is very valuable. Investigations would be more accurate since the system will provide precise data prior to, during, and after the accident. Additionally, insurance companies will benefit due to improved investigation assessments. Existing event recorders record various data sets, but typically do not monitor the recorded data in order to provide alarms or other system notifications to other systems. Therefore, although event recorders have access to a large amount of pre-determined and generated locomotive signals, such as signals received from on-board train management systems, cab signaling systems, energy management systems, exhaust aftertreatment monitoring systems, braking systems, communication management systems, and operator fatigue or distraction monitoring systems, a great deal of potential real-time functionality that may be associated with access to this information remains under-utilized.

An integrated diagnostic, telemetry, and recording system for use with a locomotive is disclosed in U.S. Pat. No. 7,593,963 of Ballesty et al. that issued on Sep. 22, 2009 (the '963 patent). The '963 patent discloses a method of remotely detecting and controlling whether locomotive data indicative of at least one of integrated diagnostic data, telemetry data and recording systems data from a locomotive is valid locomotive data. The event recorder of the '963 patent records and transmits video, geographic data, and locomotive operating parameters, and allows for remote monitoring and diagnostics of track conditions, wayside equipment, and operator train management.

Although the system of the '963 patent may improve safety and aid in investigations regarding the operation of a locomotive, it may be less than optimal. In particular, the disclosed system of the '963 patent does not provide an event recorder that is able to synchronize data from a multitude of different sources. The system of the '963 patent also does not provide a customizable application programming interface (API) as part of the event recorder, allow a user to customize which particular events, operational characteristics, or any combination thereof will result in the generation of a system notification related to a desired system of the locomotive, and transmit such system notifications to one or more additional systems on-board the locomotive that may benefit from that system information.

The system and method of the present disclosure solves one or more problems set forth above and/or other problems in the art.

SUMMARY

In one aspect, the present disclosure is directed to an event recorder system carried on-board a locomotive. The system may include a controller configured to receive data from one or more of a train management system, a cab signaling system, an energy management system, an exhaust aftertreatment monitoring system, a braking system, a communications management system, and an operator fatigue or distraction monitoring system, wherein the data comprises one or more of video data, audio data, sensor output data, GPS map data, scanned image data of an operator in a cab of the locomotive, and operational data associated with operation of the locomotive during a trip. The controller may be configured to synchronize the data based on a common attribute associated with all of the data received by the controller, receive from a user one or more customizable parameters predetermined to be indicative of one or more of a system-related characteristic or behavior associated with any one or more of the systems from which the controller receives data, and generate a system notification based on an indication of one or more of a system-related characteristic or behavior that one of falls outside of a predetermined range of system-determinable parameters, or indicates a trend in one or more system-determinable parameters that deviates from an expected trend in the one or more system-determinable parameters. The controller may also be configured to receive from the user a change to the one or more customizable parameters, and determine whether the changed one or more customizable parameters warrants generation of another system notification based on an indication of one or more of a system-related characteristic or behavior of a different one of the one or more systems.

In another aspect, the present disclosure is directed to a computer-implemented method of operating an event recorder system on-board a locomotive. The method may include receiving data at a controller of the event recorder system from one or more of a train management system, a cab signaling system, an energy management system, an exhaust aftertreatment monitoring system, a braking system, a communications management system, and an operator fatigue or distraction monitoring system. The data may include one or more of video data, audio data, sensor output data, GPS map data, scanned image data of an operator in a cab of the locomotive, and operational data associated with operation of the locomotive during a trip. The method may further include synchronizing the data using the controller based on a common attribute associated with all of the data received by the controller, receiving at the controller from a user one or more customizable parameters predetermined to be indicative of one or more of a system-related characteristic or behavior associated with any one or more of the systems from which the controller receives data, and generating a system notification using the controller based on an indication of one or more of a system-related characteristic or behavior that one of falls outside of a predetermined range of system-determinable parameters, or indicates a trend in one or more system-determinable parameters that deviates from an expected trend in the one or more system-determinable parameters. The method may still further include receiving at the controller from the user a change to the one or more customizable parameters, and determining with the controller whether the changed one or more customizable parameters warrants generation of another system notification based on an indication of one or more of a system-related characteristic or behavior of a different one of the one or more systems.

In still another aspect, the present disclosure is directed to an event recorder system carried on-board a locomotive. The system may include a controller configured to receive data from one or more of a train management system, a cab signaling system, an energy management system, an exhaust aftertreatment monitoring system, a braking system, a communications management system, and an operator fatigue or distraction monitoring system. The data may include one or more of video data, audio data, sensor output data, GPS map data, scanned image data of an operator in a cab of the locomotive, and operational data associated with operation of the locomotive during a trip. The controller may be further configured to receive from a user one or more customizable parameters predetermined to be indicative of one or more of a system-related characteristic or behavior associated with any one or more of the systems from which the controller receives data, and generate a system notification based on an indication of one or more of a system-related characteristic or behavior that one of falls outside of a predetermined range of system-determinable parameters, or indicates a trend in one or more system-determinable parameters that deviates from an expected trend in the one or more system-determinable parameters. The controller may be still further configured to communicate the system notification to one or more different systems from the one or more systems associated with the user customizable parameters.

DETAILED DESCRIPTION

Figure 1:
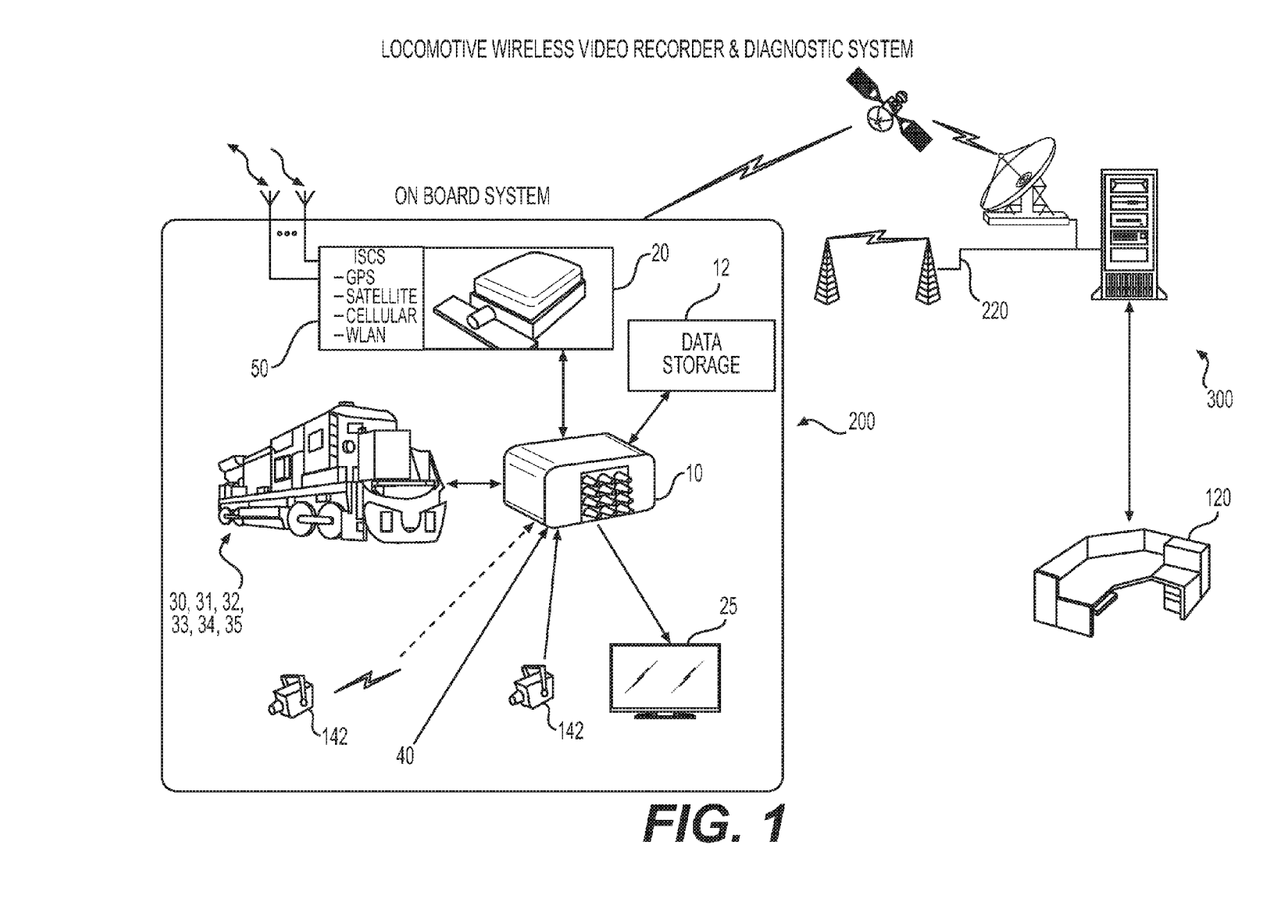
FIG. 1 is a schematic diagram of an exemplary locomotive event recorder system in accordance with an embodiment of this disclosure.
Figure 2:
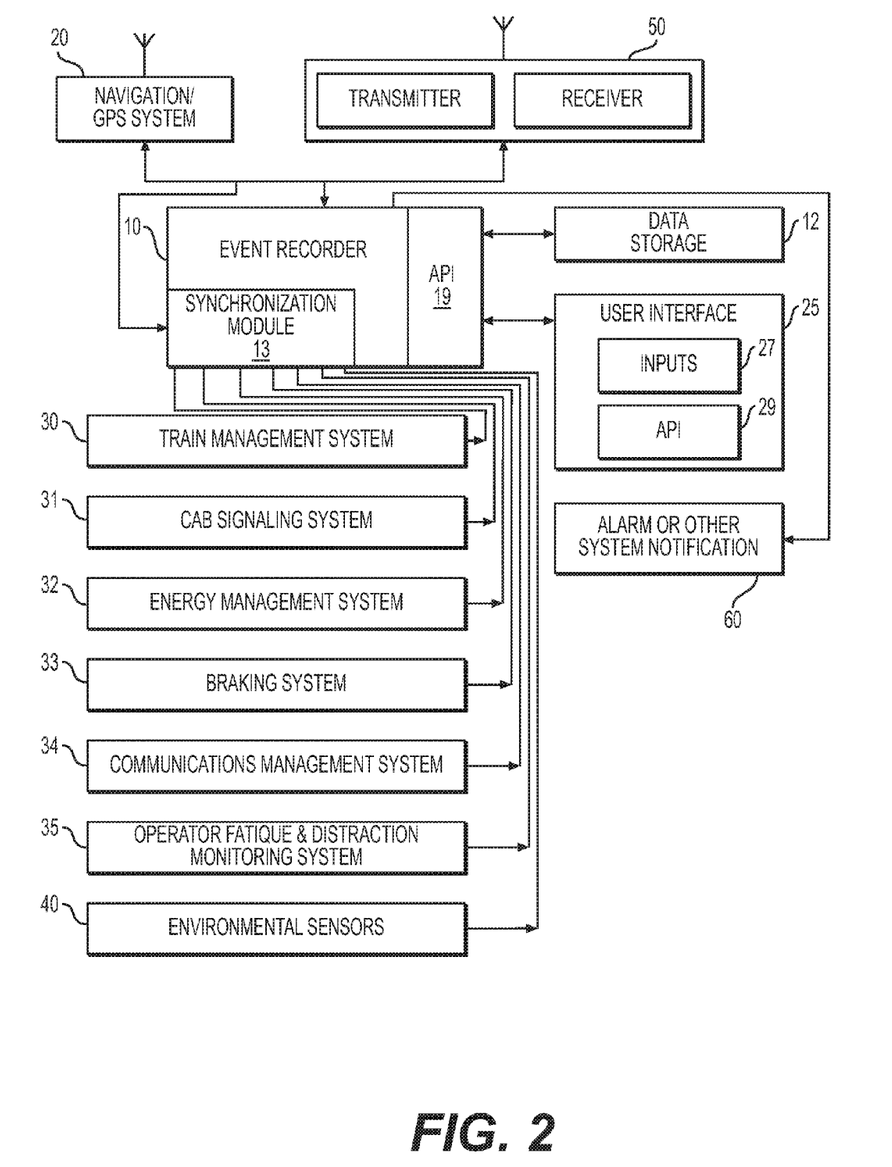
FIG. 2 is a block diagram showing elements of the exemplary locomotive event recorder system of FIG. 1.

FIGS. 1 and 2 illustrate a locomotive event recorder system 10, which may include an on-board group of systems 200 and off-board systems 300. An event recorder system 10 may be included on-board the locomotive and may be configured to receive data from a number of on-board systems 200 as well as from user inputs entered at a user interface 25 on-board the locomotive and/or at an off-board back-office/customer control center 120. Additional data may be provided to the event recorder from a variety of sensing devices, including cameras 142 and environmental sensors 40. Event recorder system 10 may be configured to record and transmit relevant video data, audio data, sensor output data, geographic data, operator-related data, and locomotive operating parameters to assist in resolving issues related to accidents and overall train performance.

As shown in FIG. 2, event recorder system 10 may include one or more controllers or processors configured to perform various functions, including the recording of event data as well as monitoring and diagnostics of track conditions, wayside equipment, and operator train management. An on-board event recorder in accordance with various implementations of this disclosure may monitor and record the data received from selected systems on-board and off-board the locomotive. Rather than simply recording the data received for later evaluation, event recorder system 10 may be configured to monitor and evaluate the data on a real-time basis, and determine whether to transmit system notifications, including alarms, to other systems or off-board the locomotive to the back-office/customer control center 120. One or more controllers or processors of event recorder system 10 may further include the ability to host application logic/software that can be configured per a customer's specific requests and processed locally on the event recorder. The application logic may be in the form of applications developed by a railroad authority, customer, or other third party. Event recorder system 10 may include an application programming interface (API) 19 in the form of one or more routines, protocols, and tools for custom building and configuring various software and applications designed to meet specific customer needs under different situations.

Event recorder system 10 may be configured to receive data from one or more of a train management system 30, a cab signaling system 31, an energy management system 32, an exhaust aftertreatment monitoring system (not shown), a braking system 33, a communications management system 34, and an operator fatigue or distraction monitoring system 35. The data received by the event recorder may include one or more of video data, audio data, sensor output data, GPS map data, scanned image data of an operator in a cab of the locomotive, and operational data associated with operation of the locomotive during a trip. Event recorder system 10 may also include a synchronization module 13 configured to synchronize the data received from the various systems based on a common attribute associated with all of the data received by the controller, and data storage 12 configured to record the data.

The one or more controllers or processors of event recorder system 10 may be configured to receive from a user one or more customizable parameters predetermined to be indicative of one or more of a system-related characteristic or behavior associated with any one or more of the systems from which the controller receives data. A controller of event recorder system 10 may generate a system notification based on an indication of a system-related characteristic or behavior that falls outside of a predetermined range of system-determinable parameters. Additionally or in the alternative, a controller of event recorder system 10 may generate a system notification based on a trend in one or more system-determinable parameters that deviates from an expected trend in the one or more system-determinable parameters. As one example, the event recorder may allow the operator of a particular locomotive or consist of locomotives to input a specific range for fuel consumption and/or emission levels during all or a portion of a particular trip plan as one or more customizable parameters indicative of a desired characteristic of the train management system and/or the energy management system. The event recorder 10 may be configured to monitor recorded data associated with train management system 30 and energy management system 32 to determine whether the selected operational characteristics are falling outside of a predetermined range, or trending away from an expected pattern. A system notification based on any unexpected deviations may be provided to one or more other systems to allow for system-wide adjustments that may aid in the return to expected parameters. For example, adjustments to the braking patterns for a particular locomotive or consist of locomotives traveling over a particular portion of a trip plan may facilitate achievement of goals associated with other systems such as the train management system and the energy management system. As another example, an operator may be fatigued or distracted in some circumstances, and operator fatigue and distraction monitoring system 35 may be customized to detect certain levels of fatigue or distraction that begin to affect energy management, train management, braking, or other systems. The event recorder in accordance with various implementations of this disclosure may utilize the large amounts of sensory output data and locomotive operational signal data that are being recorded and monitored in order to generate high-level system-wide notifications and/or alarms.

Event recorder 10 may also be configured to receive from the operator a change to the one or more customizable parameters associated with one system at any time during operation of the locomotive, and determine whether the changed one or more customizable parameters warrants generation of another system notification based on an indication of a system-related characteristic or behavior of a different one of the systems. Event recorder system 10 may include one or more controllers or processors configured to synchronize the data received from a plurality of the systems by using tagged metadata comprising a universal time stamp associated with the data to synchronize the data. Alternatively or in addition, the event recorder may include the one or more controllers or processors being configured to synchronize the data received from a plurality of the systems by using tagged metadata comprising information on location of the locomotive relative to a landmark.

User interface 25 on-board the locomotive may also include various inputs 27 and an API 29 configured to facilitate interaction by an operator with event recorder system 10. API 19, 29 may be configured to facilitate selective sharing of the data received from one or more of the systems with one or more third-party applications. One or more controllers or processors of event recorder system 10 may also be configured to allow a user to prioritize the one or more systems such that a system notification associated with one of the customizable parameters associated with one of the systems takes priority over a system notification associated with one of the customizable parameters associated with another of the systems. API 19, 29 on user interface 25 and event recorder system 10 may be configured to provide an operator, customer, railroad authority, or other third party with the ability to immediately customize system notifications and alarms in order to observe the effects such customized notifications may have on overall train performance and safety. One or more controllers or processors of event recorder system 10 may be further configured to evaluate at least two of the one or more customizable parameters received from a user and associated with at least two different ones of the systems from which the controller receives data. The controllers or processors may be configured to determine an effect that a change to one of the at least two customizable parameters associated with a first system has on a second of the at least two customizable parameters associated with a second system. Event recorder system 10 may be configured to transmit a system notification associated with the second system if the effect on the second system caused by the change to one of the at least two customizable parameters associated with the first system exceeds a threshold.

User interface 25 may be configured for displaying the data received from the various systems and recorded by event recorder system 10 in data storage 12. User interface 25 may include an electronic display with a graphical user interface (GUI) implemented on any of a variety of computing devices. The various types of computing devices may include, but are not limited to, a laptop computing device, a personal computer (PC) device, a touch-screen computing device, a tablet computer, a personal digital assistant (PDA), a smartphone, or a dedicated event recorder playback device. User interface 25 may be divided into sections or areas that may be fixed in size and relationship to each other, or provided as windows that may be reconfigured, resized, and repositioned relative to each other using a GUI manager. In various implementations, the areas may include a graphical display area in which data received from the various systems may be displayed in graphical form. The data may be retrieved by event recorder 10 in real time, such as over a wireless, wired, or combination wireless and wired network 220 connected to the event recorder. Alternatively or in addition, the data may be retrieved from data storage medium that has been removed from the event recorder, or to which data from the event recorder has been transferred. A display area of user interface 25 may include Global Positioning System (GPS) map data of the geographical area within which the locomotive was traveling while the data retrieved from various systems was being recorded. Another display area of user interface 25 may be provided for the display of video data captured by one or more cameras 142 mounted on the locomotive. Some of the data from the various systems may also be presented on user interface 25 in tabular form within yet another display area.

The various types of computing devices that may include user interface 25 may be provided with software applications, or may access these software applications from external sources over a real-time communication network 220 such as the Internet. Application Programming Interface (API) 29 may be provided between the software applications and GUI software to provide a user with certain configurable features and operations. A user may vary the customizable parameters associated with different system-level characteristics or behavior in real-time, and may also vary operations for the presentations of data on user interface 25. The data received from the systems and presented in the various display areas of user interface 25 may be synchronized based on a common attribute associated with all of the stored data. Common attributes may include a universal time stamp that is associated with each of the types of data being presented. The universal time stamp may be included as metadata, which is data that is descriptive of the data to which it is attached. Other examples of the types of metadata that may be attached to or associated with the data being presented may include information relating to a particular landmark or geographical position at or near which the data was being recorded.

A time period of data recorded by an event recorder on the locomotive may be selected based at least partially upon a length of time before an event, such as an accident, that may include significant data or signals potentially relevant to determining the cause of the event. Data or signals that may be considered significant or relevant to determining the cause of an event may be data indicative of parameters, characteristics, or commands, but for the existence of which, the event would most likely not have happened. A determination of which data may be relevant to determining the cause of an event may be based at least in part on one or more of empirical data and historical data. In the case of an event recorder mounted on a locomotive, significant data or signals may include data indicative of locomotive operating parameters, locomotive control signals, locomotive performance characteristics, operator fatigue or distraction, and sounds and sights both internal to and external to the locomotive as detected by audio and video sensors. Other significant data may be indicative of engine operating parameters, exhaust characteristics, and electrical parameters. Operator or central control commands and other wireless signals or wired signals provided over multi-unit (MU) trainline communication buses may also be provided to event recorder system 10. Still further significant data may include data indicative of environmental conditions, as provided by environmental sensors 40, geographical location, as provided by navigation/GPS system 20, or other unusual conditions or events exterior to the vehicle on which the event recorder is mounted.

As shown in FIG. 2, an exemplary event recorder system 10 may be configured to receive and synchronize data from a plurality of systems on-board a locomotive, including a train management system 30, a cab signaling system 31, an energy management system 32, a braking system 33, a communications management system 34, an operator fatigue and distraction monitoring system 35, and a variety of different environmental sensors 40. A synchronization module 13 may be included as part of the event recorder system 10, or in some implementations, may be one or more separate synchronization modules associated with each of the individual systems supplying data to event recorder system 10.

One or more controllers or processors associated with event recorder system 10 may embody single or multiple microprocessors that may form one or more modules configured (e.g., programmed) for requesting and/or receiving various types of data. The various types of data may include video data, audio data, sensor output data, GPS map data, scanned image data of an operator in a cab of the locomotive, and operational data associated with operation of the locomotive during a trip. The types of data received by event recorder system 10 may include locomotive data indicative of one or more locomotive operating parameters, locomotive control signals, and locomotive performance characteristics. Engine operating and performance data may also be requested and received by one or more controllers of event recorder system 10 and displayed graphically in a display area of user interface 25. Additional types of data may include, but are not limited to electrical data, exhaust characteristics, and positive train control (PTC) data. PTC data is indicative of the actual location of a train at all times, such as may be obtained from one or more global positioning system (GPS) sensors, and autonomous command signals that implement control of the actual location of the train and where the train is allowed to move for safety reasons. One or more controllers associated with synchronization module 13 of event recorder system 10 may also be configured for associating and encoding a universal time stamp derived from a common time source with each of the various types of data in order to enable real-time synchronization of all the recorded data when re-creating an event on user interface 25. By associating a universal time stamp with all of the various types of data received by the event recorder controller, the controller may avoid the need to stitch together the various types of data after the data has been separately recorded and associated with separate time sources that may not reflect exactly the same time. As one example, an event recorder controller may receive frames of video and/or audio data from an internet protocol (IP) camera 142 mounted at the front of the train, and record that data side-by-side with other types of data received at the same point in time. The point in time associated with each of the different types of data may be a universal time stamp in that it is derived from a common time source for all of the types of data. The other types of data may include the sound of a train horn, actuation of a brake lever by an operator, a signal received from a GPS sensor, a change in throttle setting, a sudden change in exhaust characteristics, the position of the train relative to a train crossing, and the speed and acceleration or deceleration of the train.

Cameras 142 can be positioned to record an environment that is within the field of view of each of the cameras. Cameras 142 may be configured and arranged to record video of areas to the sides of the locomotive, above or below the locomotive, in front of or behind the locomotive, or inside the locomotive cab. Cameras positioned to record video data from inside the locomotive cab may provide a record of operator actions and/or the positions of controls and gauges on one or more control panels. In some examples, each camera may pan, tilt, and zoom to change the field of view. Each camera may also include a microphone to acquire audio data or to trigger the recording of data. As one example, the blowing of the train horn as the train approaches a crossing may trigger the recording of data by the cameras.

Event recorder system 10 may be configured to receive data from one or more sensors, alarms, or other devices that detect engine operating and performance data, electrical data, throttle control data, air and fuel pressures, brake activation, exhaust characteristics, and PTC data. Navigation/GPS system 20 may be provided to generate an indication of the current position of the locomotive on a map of the geography along the track on which the train is traveling at the time the data is being recorded. In various implementations, navigation/GPS system 20 may be provided as part of event recorder system 10, or may include data received from sources external to the event recorder. GPS map data may be received from preexisting data sources, including a library of GPS maps for the region in which the train is traveling. One or more GPS sensors mounted on the locomotive may provide data on the exact location of the locomotive relative to a preexisting map at any particular point in time. Each data source can also associate the detected data with a time period of occurrence. Data collected by the various data sources can be sensor data collected automatically and at specific time periods (e.g. once a second). Alternatively or in addition, data may be collected in association with alarm messages or other system notifications, commands received from an onboard operator, commands received from back office/customer control center 120, or other initiating events. A common attribute such as a universal time stamp or the presence of a landmark or geographical position may be associated with all of the types of detected data, and may be included as metadata attached to the data.

Event recorder system 10 may be configured to transmit audio-visual data streams to data storage 12, which may be housed within a crash-hardened solid state drive. Data storage 12 may also comprise locomotive operational parameters data storage and other historical and empirical data associated with operations of the various systems on-board and off-board the locomotive or consist of locomotives. One of ordinary skill in the art will recognize that the functions of event recorder system 10 could be performed by any number of microprocessors and/or memory devices positioned in the event recorder and/or connected to the event recorder through a network. As shown in FIG. 1, the data recorded by event recorder system 10 may be communicated to off-board back office/customer control center 120 over communication network 220. This transmission may occur in real time via a wireless, wired, or combination wireless/wired network. Alternatively or in addition, data may be transferred from event recorder system 10 after an event, such as when the data is downloaded from an event recorder recovered from an accident site. A data processing application may receive data from event recorder system 10 and from data storage 12, process the data, and generate an output that can be used to drive the GUI displayed on user interface 25.

Data presented on user interface 25 can be displayed in a variety of formats such as graphical, textual, or video format. The display areas of user interface 25 can have a number of shapes, sizes, aspect ratios, and settings. A video display area of user interface 25 can also display more than one video clip. For example, three different video clips associated with cameras 142 pointed in three different directions could be displayed. The display area on user interface 25 for presenting the recorded data from various systems may be provided with a time bar. Movement of a scrollbar along the time bar may allow a user to select a current time of interest. The time bar may span a range of time that covers all or less than all of the time during which a train was moving along a particular length of track. This time period may cover many hours, and therefore the corresponding GPS map data displayed on user interface 25 may cover a large geographical area. A user can change the position of the scrollbar or the position of a cursor on user interface 25 in order to indicate a new time or geographical position of interest. The various functionalities of user interface 25, including inputs 27 and API 29 may enable the user to customize exactly what system notifications associated with different systems may be desired, and the interrelationships and effects that the observed and recorded characteristics and behaviors of one system may have on any other system.

One or more controllers or processors associated with user interface 25 may be further configured to display real-time data being acquired by and transmitted from various sensors and other data sources on and off of the train. This real-time data may be in addition to the data downloaded from data storage 12 of event recorder system 10. The controllers or processors associated with user interface 25 may be configured to receive data that is being transmitted over a communication network, either wirelessly, over a wired communication path, or by a combination of wireless and wired communication paths. This feature may facilitate operation or diagnostics of the locomotive in addition to the reconstruction of an event such as an accident. Various sensor and data sources may provide the video/audio data, locomotive operational parameters data, and GPS map data. As discussed above, exemplary sources of information may include train management system 30, cab signaling system 31, energy management system 32, an exhaust aftertreatment system (not shown), braking system 33, communications management system 34, and operator fatigue and distraction monitoring system 35. The various systems may provide data and signals indicative of the operational performance and status of the locomotive. For example, data received by event recorder system 10 may include power commands, engine speed, locomotive speed, traction feedback, pneumatic brakes, brake pressures, dynamic braking, load, throttle, operating faults, ambient temperature, commanded parameters and the like. Another data source may be the multi-unit (MU) cables or trainlines that run between locomotives in a train and provide operation status and carry command and control signals. For example, the MU cables may carry signals that include data on an operator's power/brake commands, direction calls, power modes, and the like. Moreover, data can also be collected directly from various locomotive and environmental sensors, control circuits and devices, track geometry monitors, smoke and fire detectors, chemical or fuel detectors, engine-on relays and emergency brake relays, locomotive horn and bell indications, hot wheel or hot bearing sensors, and impact sensors. Other environmental and operational parameters that may be observed and recorded may include, but are not limited to, weather conditions, track conditions, track topology, elevation direction and heading.

INDUSTRIAL APPLICABILITY

The disclosed event recorder system is able to synchronize data from a multitude of different sources and monitor that data in real-time for characteristics or trends in behavior of one or more systems on-board or off-board a locomotive or consist of locomotives. In addition to being able to generate system notifications or alarms related to specific events, event recorder system 10 is able to use all of the data acquired in real-time from many different systems and provide system notifications to specific systems in addition to those from which the data was received. Event recorder system 10 may therefore expand the traditional role of an event recorder from simply recording data associated with specific events as they occur. Event recorder system 10 in accordance with various implementations of this disclosure may also use the constant flow of data acquired from all systems in a higher-level, system-focused approach that may improve overall locomotive operational efficiencies and safety. Moreover, event recorder system 10 may provide a customizable application programming interface (API) as part of the event recorder, which may allow a user to customize which particular events, operational characteristics, trends in behavior, or any combination thereof will result in the generation of a system notification related to a desired system of the locomotive, and transmit such system notifications to one or more additional systems on-board the locomotive that may benefit from that system information.

A computer-implemented method of operating event recorder system 10 on-board a locomotive may include receiving data at one or more controllers or processors of the event recorder system from one or more of a train management system, a cab signaling system, an energy management system, an exhaust aftertreatment monitoring system, a braking system, a communications management system, and an operator fatigue or distraction monitoring system. The data may include one or more of video data, audio data, sensor output data, GPS map data, scanned image data of an operator in a cab of the locomotive, and operational data associated with operation of the locomotive during a trip. The computer-implemented method performed by event recorder system 10 may also include synchronizing the data using one or more controllers or processors based on a common attribute associated with all of the data received at the event recorder.

Various exemplary methods performed by event recorder system 10 may also include receiving at the one or more controllers or processors one or more customizable parameters input by an operator or other third-party. The customizable parameters may be predetermined to be indicative of one or more of a system-related characteristic or behavior associated with any one or more of the systems from which the controllers or processors receive data. The methods performed by event recorder system 10 may still further include generating a system notification using at least one controller or processor based on an indication of one or more of a system-related characteristic or behavior that falls outside of a predetermined range of system-determinable parameters. In addition or alternatively, one or more system notifications may be generated based on an observed trend in one or more system-determinable parameters that deviates from an expected trend in the one or more system-determinable parameters, or that exceeds a threshold.

In some exemplary implementations of this disclosure, one or more controllers or processors of event recorder system 10 may receive from an operator or other third-party a change to the one or more customizable parameters. The controllers or processors may then determine whether the changed one or more customizable parameters warrants generation of another system notification based on an indication of a system-related characteristic or behavior of a different one of the systems.

As discussed above, various exemplary implementations of this disclosure may include synchronizing the data received from a plurality of the systems by using tagged metadata comprising a universal time stamp associated with the data to synchronize the data. Alternatively or in addition, one or more controllers or processors of event recorder 10 may synchronize the data received from a plurality of the systems by using tagged metadata comprising information on location of the locomotive relative to a landmark.

The computer-implemented methods in accordance with various implementations of this disclosure may further include providing the controller with an application programming interface (API) that comprises one or more routines, protocols, and tools for interfacing with one or more third party applications. The API may facilitate sharing of the data received from one or more of the systems with the one or more third party applications. This capability of event recorder system 10 may allow for continued improvements and advancements in the ability of the various systems of the locomotive or consist of locomotives to adapt in real-time to recorded and monitored data received by event recorder system 10 from all on-board and off-board systems.

The computer-implemented methods performed by event recorder system 10 may further include receiving input from the user to prioritize the one or more systems such that a system notification associated with one of the customizable parameters associated with one of the systems takes priority over a system notification associated with one of the customizable parameters associated with another of the systems. Generation of system notifications may include generating an alarm in some instances. The methods performed by event recorder system 10 may still further include evaluating at least two of the one or more customizable parameters received from a user and associated with at least two different ones of the one or more systems from which the controller receives data. Event recorder system 10 may determine an effect that a change to one of the at least two customizable parameters associated with a first system has on a second of the at least two customizable parameters associated with a second system. Event recorder system 10 may then transmit a system notification associated with the second system if the effect on the second system caused by the change to one of the at least two customizable parameters associated with the first system exceeds a threshold.

It will be apparent to those skilled in the art that various modifications and variations can be made to the disclosed system and methods without departing from the scope of the disclosure. Other implementations of the disclosed event recorder system and methods will be apparent to those skilled in the art from consideration of the specification and practice of the methods disclosed herein. It is intended that the specification and examples be considered as exemplary only, with a true scope of the disclosure being indicated by the following claims and their equivalents.

What is claimed is:

1. An event recorder system carried on-board a locomotive, the system comprising:
a controller configured to:
receive data from one or more of a train management system, a cab signaling system, an energy management system, an exhaust aftertreatment monitoring system, a braking system, a communications management system, and an operator fatigue or distraction monitoring system, wherein the data comprises one or more of video data, audio data, sensor output data, GPS map data, scanned image data of an operator in a cab of the locomotive, and operational data associated with operation of the locomotive during a trip;
synchronize the data based on a common attribute associated with all of the data received by the controller;
receive from a user one or more customizable parameters predetermined to be indicative of one or more of a system-related characteristic or behavior associated with any one or more of the systems from which the controller receives data;
generate a system notification based on an indication of one or more of a system-related characteristic or behavior that one of falls outside of a predetermined range of system-determinable parameters, or indicates a trend in one or more system-determinable parameters that deviates from an expected trend in the one or more system-determinable parameters;
receive from the user a change to the one or more customizable parameters;
determine whether the changed one or more customizable parameters warrants generation of another system notification based on an indication of one or more of a system-related characteristic or behavior of a different one of the one or more systems; and
allow the user to prioritize the one or more systems such that a system notification associated with one of the customizable parameters associated with one of the systems takes priority over a system notification associated with one of the customizable parameters associated with another of the systems.

2. The event recorder system of claim 1, wherein the controller is further configured to synchronize the data received from a plurality of the systems by using tagged metadata comprising a universal time stamp associated with the data to synchronize the data.

3. The event recorder system of claim 1, wherein the controller is further configured to synchronize the data received from a plurality of the systems by using tagged metadata comprising information on location of the locomotive relative to a landmark.

4. The event recorder system of claim 1, wherein the controller is further configured to include an application programming interface (API) that comprises one or more routines, protocols, and tools for interfacing with one or more third-party applications.

5. The event recorder system of claim 4, wherein the API is configured to facilitate sharing of the data received from one or more of the systems with the one or more third-party applications.

6. The event recorder system of claim 1, wherein the system notification is an alarm.

7. The event recorder system of claim 1, wherein the controller is further configured to evaluate at least two of the one or more customizable parameters received from a user and associated with at least two different ones of the one or more systems from which the controller receives data and determine an effect that a change to one of the at least two customizable parameters associated with a first system has on a second of the at least two customizable parameters associated with a second system.

8. The event recorder system of claim 7, wherein the controller is further configured to transmit a system notification associated with the second system if the effect on the second system caused by the change to one of the at least two customizable parameters associated with the first system exceeds a threshold.

9. A computer-implemented method of operating an event recorder system on-board a locomotive, the method comprising:
   receiving data at a controller of the event recorder system from one or more of a train management system, a cab signaling system, an energy management system, an exhaust aftertreatment monitoring system, a braking system, a communications management system, and an operator fatigue or distraction monitoring system, wherein the data comprises one or more of video data, audio data, sensor output data, GPS map data, scanned image data of an operator in a cab of the locomotive, and operational data associated with operation of the locomotive during a trip;
   synchronizing the data using the controller based on a common attribute associated with all of the data received by the controller;
   receiving at the controller from a user one or more customizable parameters predetermined to be indicative of one or more of a system-related characteristic or behavior associated with any one or more of the systems from which the controller receives data;
   generating a system notification using the controller based on an indication of one or more of a system-related characteristic or behavior that one of falls outside of a predetermined range of system-determinable parameters, or indicates a trend in one or more system-determinable parameters that deviates from an expected trend in the one or more system-determinable parameters;
   receiving at the controller from the user a change to the one or more customizable parameters;
   determining with the controller whether the changed one or more customizable parameters warrants generation of another system notification based on an indication of one or more of a system-related characteristic or behavior of a different one of the one or more systems; and
   receiving input from the user to prioritize the one or more systems such that a system notification associated with one of the customizable parameters associated with one of the systems takes priority over a system notification associated with one of the customizable parameters associated with another of the systems.

10. The computer-implemented method of claim 9, further including synchronizing the data received from a plurality of the systems by using tagged metadata comprising a universal time stamp associated with the data to synchronize the data.

11. The computer-implemented method of claim 9, further including synchronizing the data received from a plurality of the systems by using tagged metadata comprising information on location of the locomotive relative to a landmark.

12. The computer-implemented method of claim 9, further including providing the controller with an application programming interface (API) that comprises one or more routines, protocols, and tools for interfacing with one or more third-party applications.

13. The computer-implemented method of claim 12, wherein the API is configured to facilitate sharing of the data received from one or more of the systems with the one or more third-party applications.

14. The computer-implemented method of claim 9, wherein generating the system notification includes generating an alarm.

15. The computer-implemented method of claim 9, further including:
   evaluating at least two of the one or more customizable parameters received from a user and associated with at least two different ones of the one or more systems from which the controller receives data;
   determining an effect that a change to one of the at least two customizable parameters associated with a first system has on a second of the at least two customizable parameters associated with a second system; and
   transmitting a system notification associated with the second system if the effect on the second system caused by the change to one of the at least two customizable parameters associated with the first system exceeds a threshold.

16. An event recorder system carried on-board a locomotive, the system comprising:
   a controller configured to:
      receive data from one or more of a train management system, a cab signaling system, an energy management system, an exhaust aftertreatment monitoring system, a braking system, a communications management system, and an operator fatigue or distraction monitoring system, wherein the data comprises one or more of video data, audio data, sensor output data, GPS map data, scanned image data of an operator in a cab of the locomotive, and operational data associated with operation of the locomotive during a trip;
      receive from a user one or more customizable parameters predetermined to be indicative of one or more of a system-related characteristic or behavior associated with any one or more of the systems from which the controller receives data;
      generate a system notification based on an indication of one or more of a system-related characteristic or behavior that one of falls outside of a predetermined range of system-determinable parameters, or indicates a trend in one or more system-determinable parameters that deviates from an expected trend in the one or more system-determinable parameters;
      communicate the system notification to one or more different systems from the one or more systems associated with the user customizable parameters;

synchronize video data, audio data, sensor output data, GPS map data, scanned image data of an operator in a cab of the locomotive, and operational data associated with operation of the locomotive during a trip based on a common attribute associated with all of the recorded data; and receive input from the user to prioritize the one or more systems such that a system notification associated with one of the customizable parameters associated with one of the systems takes priority over a system notification associated with one of the customizable parameters associated with another of the systems.

17. The event recorder system of claim 16, further including:

the controller being further configured to:

evaluate at least two of the one or more customizable parameters received from a user and associated with at least two different ones of the one or more systems from which the controller receives data;

determine an effect that a change to one of the at least two customizable parameters associated with a first system has on a second of the at least two customizable parameters associated with a second system; and transmit a system notification associated with the second system if the effect on the second system caused by the change to one of the at least two customizable parameters associated with the first system exceeds a threshold.

* * * * *